United States Patent [19]

Melanson

[11] Patent Number: 5,398,441
[45] Date of Patent: Mar. 21, 1995

[54] LOBSTER TRAP/ANIMAL CAGE CONSTRUCTION

[76] Inventor: Charles A. Melanson, 20 Woodward Ave., Gloucester, Mass. 01930

[21] Appl. No.: 229,803
[22] Filed: Apr. 19, 1994
[51] Int. Cl.⁶ ............................................. A01K 69/00
[52] U.S. Cl. .................................... 43/100; 43/103; 43/102; 43/105
[58] Field of Search ............... 43/100, 102, 103, 105; 232/46

[56] References Cited

U.S. PATENT DOCUMENTS

| | | | |
|---|---|---|---|
| 1,074,276 | 9/1913 | Masek | 43/105 |
| 1,146,907 | 7/1915 | Toomy | 232/46 |
| 1,785,348 | 12/1930 | Holoribek | 43/102 |
| 3,826,032 | 7/1974 | Torngrey | 43/100 |
| 4,479,325 | 10/1984 | Jakimas | 43/105 |
| 4,654,997 | 4/1987 | Ponzo | 43/102 |
| 4,864,770 | 9/1989 | Serio | 43/100 |
| 4,897,953 | 2/1990 | Bruce | 43/100 |

Primary Examiner—Kurt Rowan
Attorney, Agent, or Firm—Don Halgren

[57] ABSTRACT

A wire trap or animal cage having walls which are attached together by crimped clips at spaced locations between the adjacent walls of the trap or cage. The clips have markings thereon to indicate ownership of the trap. The marks may be put on the clips as they are clinched together around the wires, or the marks may be put on the clips before the clips are crimped around the wires.

10 Claims, 3 Drawing Sheets

LOBSTER TRAP/ANIMAL CAGE CONSTRUCTION

BACKGROUND OF THE INVENTION

(1) Field of the Invention

This invention relates to lobster traps, fish or animal traps or cages and more particularly, to a method of constructing and indicating ownership of such traps or cages.

(2) Prior Art

Lobster traps have undergone many changes in construction over the past several generations. Early traps were made of a wood frame, put together in a box-like configuration, having a rope or twine netting stretched over the frame. One side of the wooden box construction would have hinges to permit the lobsters to be removed therefrom. The ends of the trap would have netting arranged thereacross in a funnel-like manner, to allow the lobsters to get into the traps drawn by the bait therein, but not be able to get out.

More recently, lobster and fish traps have been made of more durable construction, such as heavy gauge wire, arranged in a mesh pattern, and formed into a box-like shape, with the appropriate funnel entrances for capturing the lobsters, and hinged doors for removing the lobsters.

Bruce U.S. Pat. No. 4,893,953, shows such a lobster trap. When lobstermen place their traps in the deep water to catch the lobsters, they have their name painted onto the wooden frame, or engraved into the wood. On the newer wire mesh traps, the lobstermen would mark their traps with an orange plastic tag which would have a name or registration number. Of course, the traps would be located at the surface, by colorfly marked lobster bouys, the colors identifying the owner.

Unfortunately, this does not deter thievery out on the lonely waters, where the lobster traps are pulled from the water, and may be stolen or mistakenly taken by someone other then the rightful owner.

It is thus an object of the present invention to provide a means for simultaneous construction and identification of a lobster or animal trap.

It is a further object of this invention, to provide a means of identification, which if its attempted to be removed by a non-owner, would result in having to rebuild the entire trap and rejoin the side walls of the box-like structure completely, after having had to remove all the idenfifying indicia.

BRIEF SUMMARY OF THE INVENTION

The present invention relates to how lobster or animal trap wall portions are secured together. The typical lobster trap is a box having six side walls. The walls, for the present invention, made of heavy gauge (i.e. 10 or 12 gauge) wire peripheral edge portions with a web of wire welded in a criss-cross pattern.

The wire edge portions of each of the walls are joined together by a plurality of formable clips. These clips are crimped around adjacent wires of adjacent wall portions, thus securing those wall portions to one another and comprising the box-like lobster or animal trap.

As the clips are crimped, typically by a hand held crimping tool which includes a movable hammer member and an anvil member, between which a pair of wires to be bound together, are disposed.

The hammer, or the anvil, may have embossed markings on it, which are forced into the surface of the clips as they are crimped around adjacent wall edge wires. The clips may also have markings, brands or "bar codes" or the like premarked onto the clips prior to their being crimped onto the wires that they are joining together and identifying.

The marked clips are the only things that hold the lobster or animal traps together. Each crimped clip therefore has its owner's brand, identification number or name on it. To steal and re-identify a cage or a lobster trap, a thief would have to remove all of the clips and essentially re-build the cage/lobster trap almost in its entirety.

BRIEF DESCRIPTION OF THE DRAWINGS

The objects and advantages of the present invention will become more apparent, when viewed in conjunction with the following drawings, in which.

DESCRIPTION OF THE PREFERRED EMBODIMENT

Figure 1:
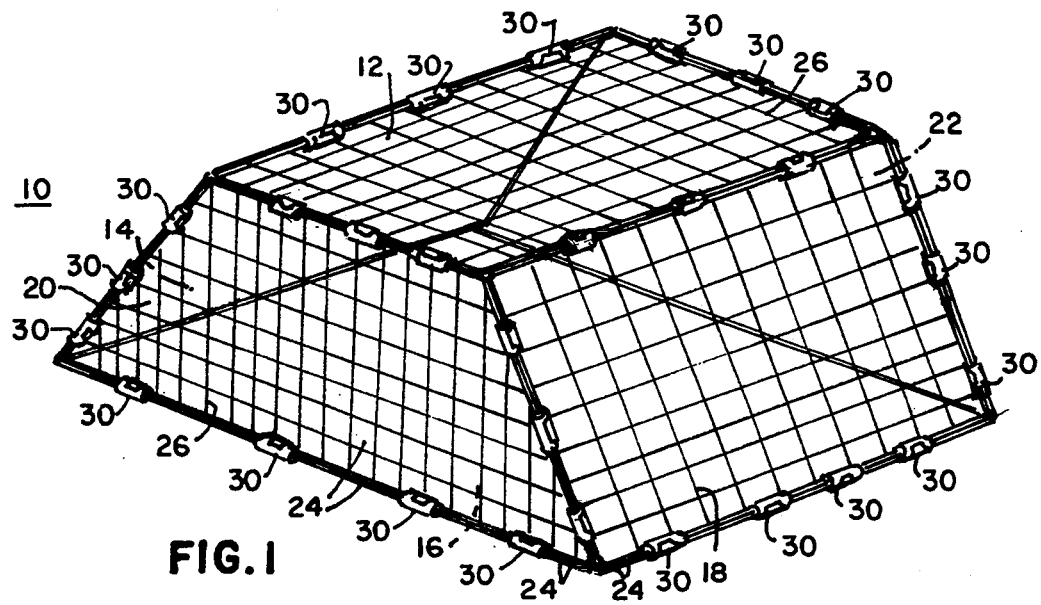
FIG. 1 is a perspective view of a lobstr trap constructed according to the principles of the present invention.

Referring now to the drawings in detail, and particularly to FIG. 1, there is shown a perspective view of a trap 10, such as a lobster trap, generally constructed of six planar side walls 12, 14, 16, 18, 20 and 22. The trap 10 could also be a fish trap, or an animal trap or cage or the like. A lobster trap would also have an entry way for lobsters to get in, but which is omitted here for clarity. Each side wall 12-22 has a wire peripheral edge 24, to which a wire mesh 26 is attached.

Figure 2:
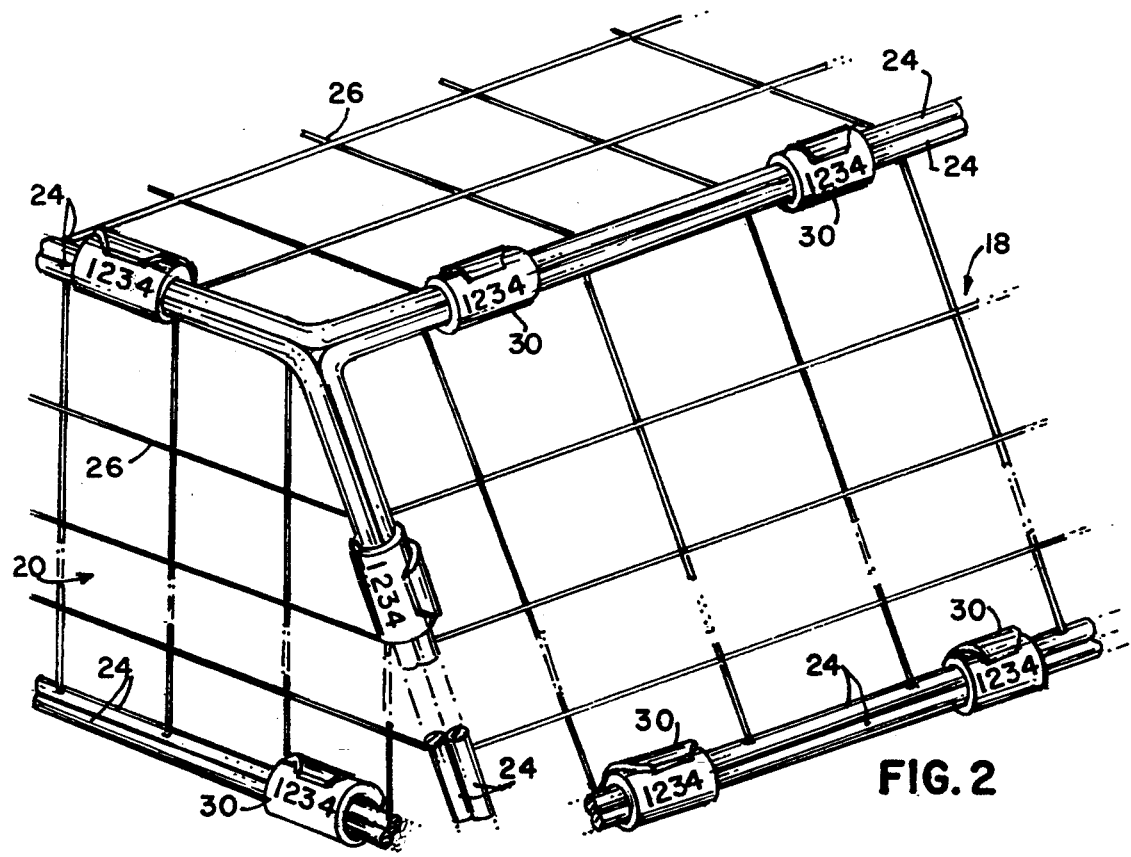
FIG. 2 is an enlarged view of several sides of a lobster trap joined together according to the principles of this invention.

The wire peripheral edges 26 of the respective walls 12-22 are what is secured together to make the (lobster) trap 10. Those respective edges 24 are secured together, by a plurality of crimped clips 30, (preferably metal) as shown more clearly in FIG. 2, wherein a corner is depicted.

Figure 3:
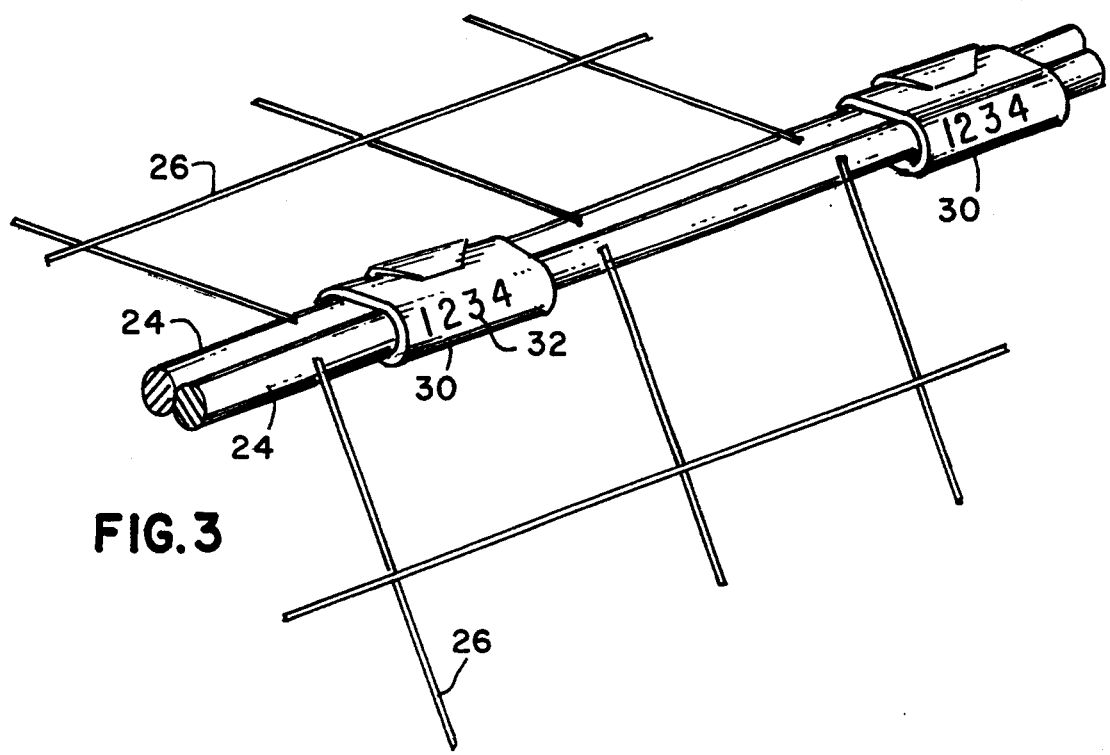
FIG. 3 is a further enlargement showing a pair of crimped identification clips securing two walls of a lobster trap together.
Figure 4:
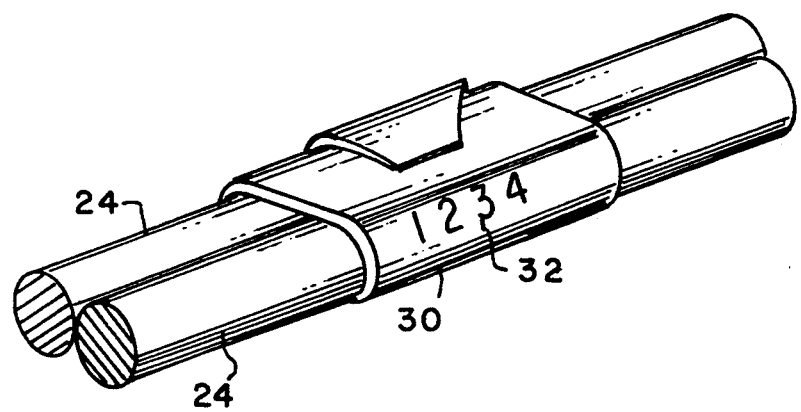
FIG. 4 is an enlargement of a crimped embossed clip holding two wires together in an identifiable manner.

The only thing holding all of the walls 12-22 together are in fact, those crimped clips 30. They may be spaced several inches apart, along adjacent edges 24, as shown more explicitly in FIG. 3. Each crimped clip 30 has an identification number, name, brand, "bar code", or mark 32 embossed, engraved, or stamped thereon. The mark 32 is put on at the time of (during) crimping each individual clip 30. FIG. 4 shows a single crimped clip 30 surrounding and securing together a pair of wires 34 and 36. The clip 30 has indicia thereon indicating ownership, location or other pertinent information.

By having each securement clip having its own identification marker on it, and those clips 30 being the only thing that is holding a (lobster) trap 10 together, a thief would have to remove all the clips and then re-assembly the trap almost from the beginning, to make sure no original owner's mark remained.

Figure 5:
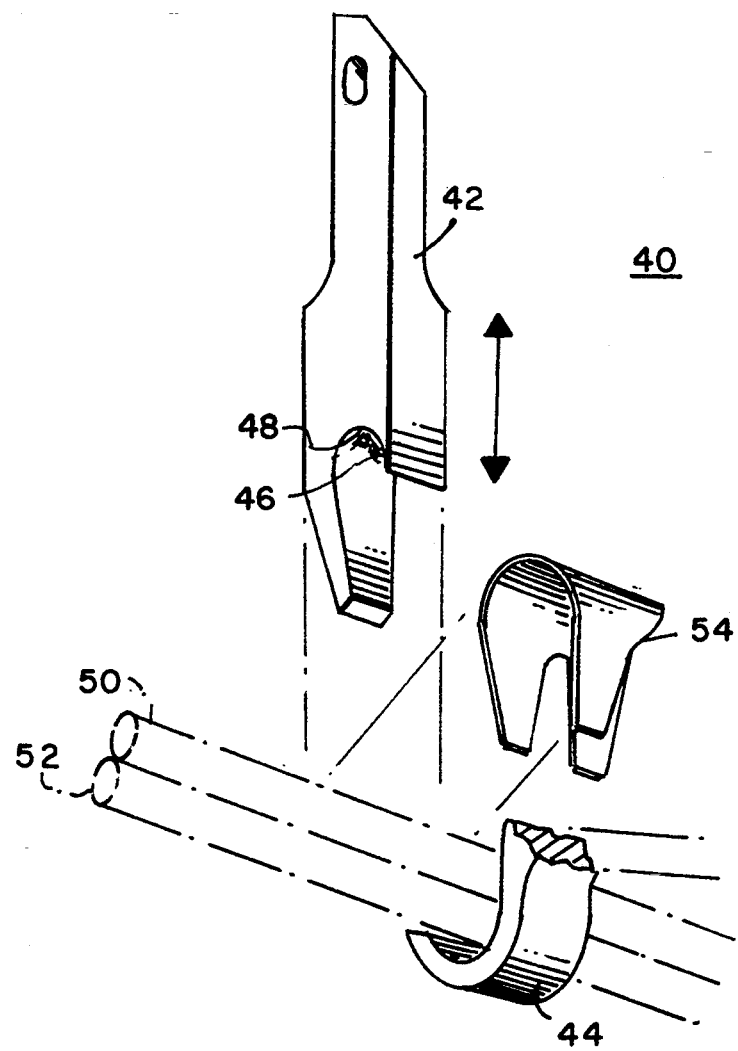
FIG. 5 is a perspective viw of part of a crimping tool showing how the identification is arranged initially on the tool before it strikes and crimps a clip around an arrangement of wires.

The clips 30 may be crimped in by a crimping tool 40, comprising a blade or hammer 42 and an anvil 44, as depicted in FIG. 5. The blade 42 in this embodiment, has marks 46 engraved or embossed upon its strike surface 48. When the blade 42 is pressed very fast and hard against the anvil 44, when a pair of wires 50 and 52 are between the blade 42 and anvil 44, with a blank clip 54 being fed therebetween, so as to be wrappable around the wires 50 and 52, they are crimped together with a desired indicia or marking thereon. A clinching tool of this nature, may for example, be a Stanley Hartco (of Skokie, Ill.) air powered clinching tool, such as shown in Hartco Clinching Tool literature for Hartco Clinching Tool Model 55, which is incorporated herein by reference.

It is noted that such a clinching tool may be adapted for securing any two adjacent wires together for marking thereof, without easy removal thereof, for example, in addition to securing traps and cages with indicia means, also for securing wire fence sections together. The crimped clips could indicate ownership or demarcation of some point along the fence. The particular marked tool (blade/anvil) could also indicate the tool operator, owner, as a means for indicating work done or property ownership. The clips could also be pre-marked before they are crimped and attached to secure wall portions or wires together. Then the blade and anvil arrangement would not have to have the markings on it which it would otherwise transfer to the clips. The clips would already be marked as they are fed into the crimpimg tool or device.

Thus, the above recited improvement in crimping and securing adjacent wires together discloses a novel and useful way of building a lobster or animal trap to discourage thievery or to identify ownership or work done on a project where adjacent wires need to be surely held together by a portable crimping tool.

I claim:

1. A trap or cage having a plurality of wire mesh side walls each having a peripheral wire defining the edge of each wall;
   a plurality of crimped securement clips spaced along portions of adjacent peripheral edge wires holding said wall portions securely together;
   at least one of said crimped securement clips having indicia thereon, to indicate ownership of said trap.

2. A trap or cage as recited in claim 1, wherein each of said clips have said indicia stamped thereon.

3. A trap or cage as recited in claim 2, wherein said crimped clips are the only means of securing adjacent walls of said trap or cage together.

4. A trap or cage as recited in claim 3, wherein said clips are metal, and said indicia is embossed thereon.

5. A method of marking ownership of and securing together a plurality of wire walls of a trap or cage, comprising the steps of:
   providing identification indicia onto the blade or anvil of a clinching tool;
   arranging peripheral wires of adjacent side walls of a trap or cage between the blade and an anvil of a clinching tool;
   supplying an unclinched clip into position on the adjacent peripheral wires of the side walls of a trap or cage;
   pressing said blade and anvil of said clinching tool together, so as to wrap said clip around said adjacent wires to secure them together and to simultaneously force the markings on said blade or anvil into the surface of said clip as it is clinched.

6. The method of claim 5, including;
   depressurizing said blade and anvil arrangement so as to permit said clinched wires to be removed from therebetween.

7. A method of identifying and securing together a plurality of wire walls of a trap or cage, comprising the steps of:
   arranging identification marks on a clinchable clip;
   arranging said clinchable clip around a plurality of wires which comprise a portion of said trap or cage;
   crimping said clinchable clip about said plurality of wires to secure them together and to provide identifying means on such assembly.

8. The method of claim 7, wherein said marks are arranged on said clip during said crimpimg process, by an engraved anvil and blade arranged on either side of said wires coming together to mark and crimp said clip simultaneously.

9. The method of claim 7, wherein said marks are arranged on said clips prior to said clips being crimped securely about said wires in a crimpng means.

10. The method of claim 7, wherein said marks consist of a bar code to identify ownership of said trap or cage.

* * * * *